March 4, 1947. J. S. STULL 2,416,964
SELF THREADING CONNECTOR FOR ARTICLES
Filed Sept. 18, 1943
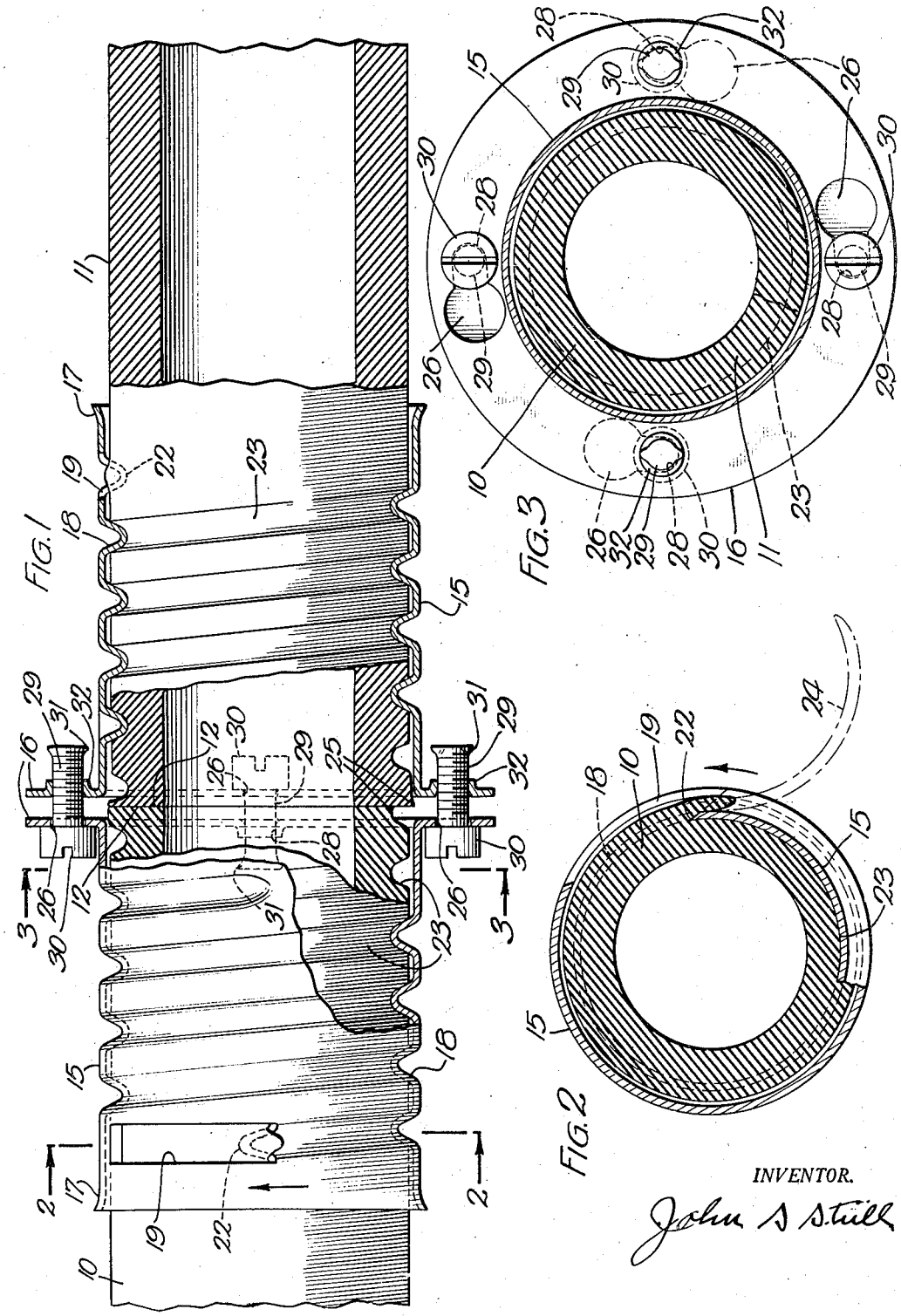
INVENTOR.
John S Stull Patented Mar. 4, 1947

2,416,964

UNITED STATES PATENT OFFICE 2,416,964

SELF-THREADING CONNECTOR FOR ARTICLES

John S. Stull, Chicago, Ill.

Application September 18, 1943, Serial No. 502,947

4 Claims. (Cl. 285—75)

This invention relates to self threading connectors for attachment to and for supporting and/or holding an article of generally circular contour or for joining two such articles, and more particularly to screw threaded connectors capable of cutting a thread in such articles for its thread to enter during relative rotation therebetween in attaching the same.

This invention is particularly applicable in one embodiment to the connecting of flexible rubber hose lengths. Different types of connectors have been devised for coupling hose, such as male and female screw threaded members attached to hose ends at the factory by pressing and rolling operations, requiring expensive tools, and which members need an annular gasket therebetween to prevent fluid leakage, the whole coupling being costly to produce. Another type of hose connector comprises a sleeve-like member which is press-fitted at each end into the bores of the hose ends and an outer slitted pronged sheath at each end fitting over the hose ends, the prongs being hammered individually into the outer surface of the hose ends to secure the connector thereto. While no separate gasket is employed to prevent leakage in this latter type of connector, it is also costly to produce and requires considerable skill and expenditure of time to provide a satisfactory coupling without leakage. Furthermore, both of these types of hose connectors, due to their particular construction, provide a passage appreciably smaller than the passage through the hose, thereby restricting the flow of liquid therethrough. The invention, in other embodiments thereof, is also applicable for connection individually to either a single hollow or a solid element of circular contour for supporting and/or holding the same either from above or for holding and/or supporting the same vertically.

An object of this invention is the provision of a simple and practicable screw-threaded connector capable of readily and quickly cutting a thread in an article of generally circular contour for its thread to enter during its attachment thereto.

In accordance with the above objects, the present invention, in one embodiment thereof, may be applied to the connecting and sealing from leakage of rubber hose lengths. For this use, two identical internally spirally threaded sleeves are provided, each flanged at one end, its opposite end having a circumferentially extending slot so arranged and aligned with the thread that the entering end of the first turn of the thread is removed, thus producing a cutting edge, the slot extending outwardly therefrom. The internal diameter of the sleeve at its greater dimension is such that the hose end may freely enter to engage the cutting edge, the sleeve being threaded onto the hose until the annular end face of the hose end extends a suitable distance outside the flanged end of the sleeve. In turning the threaded sleeve into the hose, the cutting edge cuts a thread in the form of a shallow circumferential spiral groove in the surface of the hose for its thread to enter, which serves to securely connect the sleeve to the hose to prevent longitudinal displacement therebetween when in use, the waste cut rubber being deflected outwardly through the slot, due to the shape of the cutting edge. To connect and seal two hose ends so equipped with flanged sleeves, the projecting annular faces of the hose ends are abutted and drawn together under suitable pressure by means of a plurality of clamping screws carried in the adjacent sleeve flanges, thus slightly expanding the abutting hose edges and providing a leakproof seal therebetween. Hollow or solid motion-transmitting members of circular contour and an outer surface capable of being cut in the manner described above may also be connected by a pair of identical sleeves similar to the sleeves described above.

Other embodiments of the invention may comprise a single sleeve having the features above described with or without a flange for connection to an article, such as, for example, a wax candle, for vertically supporting and holding same, in which case the flange may be shaped to provide a suitable base.

Other objects and advantages of the invention will more fully appear from the following detailed description taken in conjunction with the accompanying drawing, in which Fig. 1 is a longitudinal central sectional view, partly in elevation, through adjacent ends of hose lengths coupled and sealed by connectors embodying the features of one embodiment of the invention, and Figs. 2 and 3 are vertical sectional views taken on the lines 2—2 and 3—3, respectively, of Fig. 1.

Referring to the drawing in detail, in which the features of the invention in one embodiment thereof are shown as applied to the connecting of flexible fluid conduits having yieldable outer surface, such as, for example, rubber hose lengths, indicated at 10 and 11, having their annular end faces 12 at the two ends of the hose lengths to be connected cut in a plane substantially at right angle to the longitudinal axes of the hose lengths. Mounted on the abutting ends of the hose lengths 10 and 11 are connectors 15, identical in every respect, and although the following description is directed to the connector associated with the hose length 10, it also applies to the companion connector.

The connector 15 comprises a sleeve of metal or other suitable material having preferably an integral circular flange 16 at one end, the opposite end thereof being slightly flared outwardly, as indicated at 17, to facilitate the entering of the hose end therein. Formed in the wall of the sleeve 15 is a rolled coarse spiral thread 18, which extends without interruption from a short distance inside the flared end 17 to the extreme opposite flanged end. The entering or starting end of the thread 18 adjacent the flared sleeve end 17 is removed by forming a circumferentially extending elongated slot 19 in the wall of the sleeve, by a milling or other suitable tool, the slot starting at the entering end of the first turn of the thread and extending a suitable distance outwardly or away therefrom. A cutting edge, indicated at 22, is thus formed which lies in the path of the annular end face 12 of the hose length 10 when the sleeve 15 is aligned with and rotated onto the hose length. As the sleeve 15 is turned and advanced longitudinally onto the hose length 10, the cutting edge 22 positively cuts a shallow thread in the form of a spiral groove 23 in the peripheral surface of the hose for its thread to enter, the depth of the groove being controlled by the depth of the sleeve thread 18. As clearly shown in Fig. 1, the greatest internal diameter of the sleeve 15 is suitably larger than the diameter of the hose length 10 so that the hose may freely enter therein and it will be readily apparent that the depth of the cut groove 23 will be determined by the particular depth of the sleeve thread 18. The circumferentially extending slot 19 is of such length that it provides an outlet for the waste cut rubber or other material removed in the forming of the groove 23, the waste material, due to the shape of the cutting edge 22, being lifted out of the groove and through the slot 19 in the form of arcuate shaped lengths of material, as indicated in dotted outline at 24 (Fig. 2), when the connector is turned in the direction of the arrows. The sleeve 15 is rotated and advanced onto the end of the hose length 10 until the annular end face 12 thereof extends a suitable distance, as indicated at 25 (Fig. 1), outside the flange 16, the purpose of which will be described hereinafter.

As clearly shown in Fig. 3, the flange 16 of the connector 15 is formed with a pair of diametrically opposed bayonet slots 26 and a pair of diametrically opposed screw-threaded apertures 28, the smaller ends of the bayonet slots and the apertures being spaced 90 degrees apart. Threaded into each of the apertures are screws 29 with circular slotted heads 30 having diameters which may freely pass through the larger ends of the bayonet slots 26 of the flange 16 on the companion connector 15, the screw heads being disposed at the outer edge of the flange. The outer ends of the shanks of the screws 29 are staked, as shown at 31 (Fig. 1) after being threaded into their apertures 28 so that the screws are always attached to the connector 15 and, therefore, will not be lost or misplaced. The inner face of the flange 16 surrounding the apertures 28 is embossed, as indicated at 32 (Fig. 1), to provide greater strength and length to the thread in the walls of the apertures.

In turning the connector 15 onto the hose length, as previously described, it will be obvious that the staked screws 29 loosely threaded into the flange 16 of the connector may be used with advantage along with a screw driver, to facilitate the turning operation. Thus, the blade of the screw driver is extended laterally across the connector 15, and engaged under the screw heads 30 at opposite sides of the diametrically opposed screws 29 to provide sufficient leverage to readily turn the connector onto the hose length. It will be observed that the flange 16 is of a minimum diameter, being only sufficiently greater than the diameter of the connector sleeve 15 to provide sufficient material for the forming of the bayonet slots 26.

To couple a set of connectors 15 having the hose lengths 10 and 11 attached thereto in the manner previously described, the connectors are coaxially aligned with the end faces 12 of the hose lengths in abutting relation and the screw heads 30 carried by each connector aligned with the larger ends of the bayonet slots 26 in the companion connector and then passed therethrough, whereupon, by a relative rotary movement of the connectors, the screws are moved into the smaller ends of the bayonet slots, as shown in Fig. 3. Thereafter, the screws 29 are tightened to draw the abutting end faces 12 of the hose lengths 10 and 11 together under sufficient pressure to slightly expand the abutting hose end faces to provide a leakproof seal therebetween, as shown in Fig. 1, and maintaining an unrestricted passage through the combined hose lengths.

From the above description, it will be obvious that a simple and practicable connector is provided which, in its attachment to an article of generally circular contour, is effective to positively cut a thread therein for its thread to enter during the attaching operation. In addition to the specific application of the invention above described in detail, it will be apparent that, among other applications, it may be used to connect hollow or solid motion transmitting members of generally circular contour and also be connected to a wax candle for vertically supporting and holding the same. Furthermore, the connector may be applied to any article of generally circular contour having an outer surface capable of being formed in the manner above described during a relative rotation of the connector and article in connecting the same.

Although in the embodiment illustrated, the connector is formed with a rolled spiral groove, it is to be understood that a cut groove may be formed on the inner surface of the sleeve, in which case no groove would appear on its exterior surface.

It will be understood that the specific embodiment herein described is merely illustrative of the invention and one particular application thereof and that modifications can be made and it is capable of other applications.

What is claimed is:

1. A connector for attachment to an article of circular contour during relative rotation therebetween in attaching the same comprising a cylindrical sleeve outwardly flared at one end, a flange on said sleeve at its other end, said sleeve having a continuous inner spiral thread beginning at a point inside said flared end, and terminating at a point adjacent said flange, said sleeve having an aperture in its wall at the entering end of the first turn of the thread inside of said flared end to provide a cutting edge arranged to cut a spiral groove in the outer surface of said article for the following portion of said thread to enter, thus preventing longitudinal displacement between said sleeve and the article when in use.

2. A coupling for flexible members for transmitting fluid comprising a pair of flanged sleeves, said sleeves each being formed interiorly with continuous spiral thread formations and an aperture in its wall at the entering end of the first turn of the thread at the outer end of the sleeve to provide a cutting edge to receive therein and maintain against relative longitudinal and lateral displacement one end of a member upon relative rotation therebetween in attaching the same, the member having an end face extending slightly outside the outer end face of the flange for abutting a similarly arranged end face of the companion member, said flange faces being operatively spaced apart, and means cooperating with each of the flanges for drawing said end faces of the members together under pressure to provide a positive seal therebetween.

3. A coupling for flexible members of generally circular contour for transmitting fluid comprising a pair of flanged sleeves identical in all essentials, said sleeves each being formed interiorly to receive therein one end of a member and having continuous inner spiral thread formations, the entering end of the first thread formation being removed to provide a cutting edge arranged to cut a spiral groove in the outer surface of the member during relative rotation therebetween in attaching the same to maintain the same against longitudinal displacement, the member having an end face extending slightly outside the outer end face of the flange for abutting a similarly arranged end face of the companion member, said flange faces being operatively spaced apart, and means coperating with each of the flanges for drawing said end faces of the members together under pressure to provide a positive seal therebetween.

4. A coupling for flexible members for transmitting fluid comprising a pair of flanged sleeves identical in all essentials, said sleeves each being formed interiorly with continuous spiral thread formations to receive therein and maintain against relative longitudinal and lateral displacement one end of a member, the member having an end face extending slightly outside the outer end face of the flange for abutting a similarly arranged end face of the companion member, said flange faces being operatively spaced apart, said flanges each having cooperating identically arranged bayonet slots and screw threaded apertures, and headed screws carried in said apertures, said slots adapted to freely receive the screw heads in one position of the flanges and upon a relative rotary displacement of said sleeves and the threading of the screws into aligned apertures of the companion flange, the end faces of the members are drawn together under pressure to provide a positive seal therebetween.

JOHN S. STULL.

REFERENCES CITED

The following references are of record in the file of this patent:

UNITED STATES PATENTS

| Number | Name | Date |
| --- | --- | --- |
| 2,125,570 | Ice | Aug. 2, 1938 |
| 622,313 | Woodvine | Apr. 4, 1899 |
| 561,913 | Paquette | June 9, 1896 |
| 2,152,962 | Ice | Apr. 4, 1939 |
| 1,861,403 | Wallace | May 31, 1932 |
| 158,259 | Dulin | Dec. 29, 1874 |
| 2,207,518 | Moser | July 9, 1940 |